United States Patent [19]
Austin
[11] 3,919,162
[45] Nov. 11, 1975

[54] CATALYST SUPPLY AND RECLAMATION IN COLD BOX CORE MAKING PROCESSES

[75] Inventor: William E. Austin, Bay Village, Ohio

[73] Assignee: Airco, Inc., Montvale, N.J.

[22] Filed: Mar. 15, 1974

[21] Appl. No.: 451,645

[52] U.S. Cl. ............ 260/38; 164/12; 260/DIG. 40; 264/37

[51] Int. Cl.[2] ...................... B22C 9/14; C08L 61/10

[58] Field of Search ............................ 164/7, 12, 14; 260/DIG. 40, 38; 264/37

[56] References Cited

UNITED STATES PATENTS

| | | | |
|---|---|---|---|
| 687,079 | 11/1901 | Thom | 264/37 |
| 961,651 | 6/1910 | Schlossberg | 264/37 |
| 3,266,108 | 8/1966 | Dunning et al. | 164/12 |
| 3,409,579 | 11/1968 | Robins | 260/DIG. 40 |
| 3,795,726 | 3/1974 | Zifferer et al. | 164/43 |

*Primary Examiner*—Melvyn I. Marquis
*Assistant Examiner*—S. M. Person
*Attorney, Agent, or Firm*—David L. Rae; H. Hume Mathews; Edmund W. Bopp

[57] ABSTRACT

In cold box core making techniques, a catalyst such as dimethyethylamine (DMEA) is contacted with a core material-resin binder mixture in a core box to cause a curing of the core material. The catalyst is preferably provided from a suitable proportioning apparatus as a mixture comprising at least 10 percent and typically 12 percent liquid DMEA in an inert carrier medium such as either carbon dioxide or nitrogen gas. The catalyst/carrier mixture is supplied to a pressure tank as a 'make-up' for catalyst entrapped in core material during curing. Surplus catalyst/carrier mixture is extracted from the core box under a vacuum force, compressed, dried, purified and returned to the pressure tank for further use as a curing agent.

20 Claims, 2 Drawing Figures

CATALYST SUPPLY AND RECLAMATION IN COLD BOX CORE MAKING PROCESSES

BACKGROUND OF THE INVENTION

In producing cores usable in subsequent metal casting operations, several techniques have been widely practiced. In one well-known technique, a mixture of sand and a thermosetting resin is introduced, generally under pressure, into a core box or mold. The relatively loose particles of sand are subsequently cured or hardened upon application of sufficient heat to the core box. Although this process has been substantially automated in recent years, there is nonetheless a requirement for significant amounts of energy necessary to effect 'hot' curing of the core material. However, due to the ever increasing demand for energy of virtually all forms, and the concomitant increased costs thereof, other techniques for producing cores have been developed. One of such latter techniques which is commonly referred to as the 'cold box process' effects the curing of core material without requiring the application of heat. In this process, a core material such as sand is commonly blown into a core box or mold and suitable resin binders are added thereto. Curing of the core material is effected by the exposure of a catalyst such as dymethyethylamine (DMEA), triethylamine (TEA) or trimethylamine (TMA) to the core material and resin binder mixture. By this process, curing of core material is effected in relatively short time periods, e.g. 3–25 seconds, and most importantly, externally generated heat is not required.

While cold box core making processes have been adopted for the foregoing reasons, it has been found that due to the relatively high degree of flammability and toxicity of catalysts such as DMEA, TEA and TMA only relatively low concentrations of such catalysts in carrier media have been heretofore possible. For example, the use of air as a carrier medium has safely permitted use of TEA concentrations of only 2 percent or so due to the highly flammable nature of this catalyst. Thus, each unit volume of catalyst supplied to a core box has generally been comprised of 2 percent TMEA by weight and 98 percent of air by weight, which concentration of TEA has effectively inhibited substantial reductions in the duration of curing periods.

In the course of producing cores by the cold box process, it has also been found that approximately 50 percent of the catalyst supplied to the core material in a mold is entrapped in the core material upon curing thereof. Thus, upon opening a core box to effect the release of cured cores therefrom, substantial amounts of residual catalyst vapor are released to the working environment. However, as relatively low concentrations, e.g. 2 p.p.m. of the catalyst (in air) results in obnoxious odors and concentrations of catalysts such as DMEA above 25 p.p.m. present severe safety hazards, due to the flammability and toxicity of this catalyst, safety and health standards are readily violated by disposal of surplus catalysts in this manner. In order to avoid the foregoing adverse effects, techniques for catalyst destruction have been developed. One such technique contemplates passage of a catalyst vapor through an acid scrubber in the form of a muriatic or phosphoric acid solution. Although this technique is generally effective to destroy catalysts such as DMEA, TEA and TMA, total destruction cannot be guaranteed and even low concentrations of such catalysts in air (2 p.p.m.) produce noxious effects. Furthermore, upon continued scrubbing by an acid solution, the acid becomes effectively saturated and is eventually rendered ineffective to destroy further catalyst passed thereto. At this point, the saturated acid must be disposed of which in turn further complicates the general destruction-disposal problem of surplus catalyst. Another technique for destroying catalysts such as DMEA is incineration. This technique is not altogether satisfactory due to the energy requirements of incineration as well as the inability to assure that virtually all of the catalyst is in fact destroyed.

In some instances, the catalyst gas is just exhausted by blower and duct work to the atmosphere. It will be appreciated that regardless of the particular catalyst destruction technique utilized, cold box core making processes heretofore have, in any event, resulted in substantial losses of catalyst material. For this reason, therefore, the economic advantages attendant to the cold box process, e.g. the absence of heat requirements in the curing stage, are diminished accordingly.

OBJECTS OF THE INVENTION

It is an object of the present invention to provide methods and apparatus for improving the efficiency of cold box core making processes by reclaiming surplus catalyst material.

It is another object of the present invention to provide examplary methods and apparatus for substantially eliminating the ecological damage engendered by disposal of residual catalysts in cold box core making processes.

It is yet another object of the present invention to provide exemplary methods and apparatus for protecting operating personnel by enabling the safe handling of toxic, flammable catalyst materials in cold box core making processes in exterior or non-working areas.

It is a further object of the present invention to provide exemplary methods and apparatus for increasing the efficiency of cold box core making processes by exposing core material to catalysts of greater concentrations than heretofore in common use and consequently reducing the time required for curing such material.

It is still another object of the present invention to provide exemplary methods and apparatus for carrying a toxic and flammable catalyst material in an inert carrier medium thereby enabling the use of catalysts at concentrations heretofore unobtainable due to the flammability of catalysts at such concentrations in air.

It is yet another object of the present invention to provide exemplary methods and apparatus for adjustably proportioning the concentration by weight of a liquid catalyst in an inert gaseous carrier media.

In accordance with the present invention, a method for reclaiming surplus catalyst from a cold box core making process wherein a liquid catalyst/inert carrier mixture is supplied to a core box assembly comprises the steps of: applying a vacuum to said assembly to extract surplus catalyst/inert carrier mixture therefrom; compressing said extracted mixture to a predetermined pressure level; and returning said compressed mixture to said assembly to enable the subsequent curing of additional core material.

In accordance with the teachings of the present invention, a catalyst such as dimethylethylamine (DMEA), trimethylethylamine (TMEA), or triethylamine (TEA) is supplied to a core box at a relatively high concentration such as, for example, at least 10 percent and preferably approximately 12 percent by weight in an inert carrier medium. In order to supply catalyst material at such a concentration, novel methods and apparatus for proportioning the liquid catalyst and gaseous inert carrier medium in the foregoing percentages are provided in accordance with the invention. In providing the foregoing mixture, the flow rate of the liquid catalyst and gaseous inert carrier medium are adjustably controlled to effect a mixture of the desired proportions. The catalyst/inert carrier medium mixture is supplied at a predetermined pressure to a pressure tank, preferably maintained substantially at the predetermined pressure. The major portion of air in the sand core, typically 40 percent of the core volume, is first removed by exposure to a vacuum and released to the atmosphere in approximately 1–3 seconds. The catalyst/inert carrier mixture is then selectively passed through suitable conduits, valving and manifold devices into contact with core material to be cured in the core box or mold of a core box assembly. The surplus catalyst/inert carrier mixture which is not entrapped in the core material upon curing thereof, is collected in a manifold device by application of a vacuum thereto. The collected catalyst/inert carrier mixture may be passed to a vacuum tank, filtered and subsequently compressed to a predetermined pressure before being dried, purified and returned to the pressure tank. In this manner, the present invention enables reclamation of surplus catalyst for use in subsequent curing cycles of the cold box core making process and avoids the environmental and ecological damage caused by previous catalyst disposal techniques.

BRIEF DESCRIPTION OF THE DRAWINGS

The invention will be more clearly understood by reference to the following detailed description of an exemplary embodiment thereof in conjunction with the following drawings in which.

DESCRIPTION OF PREFERRED EMBODIMENTS

Figure 1:
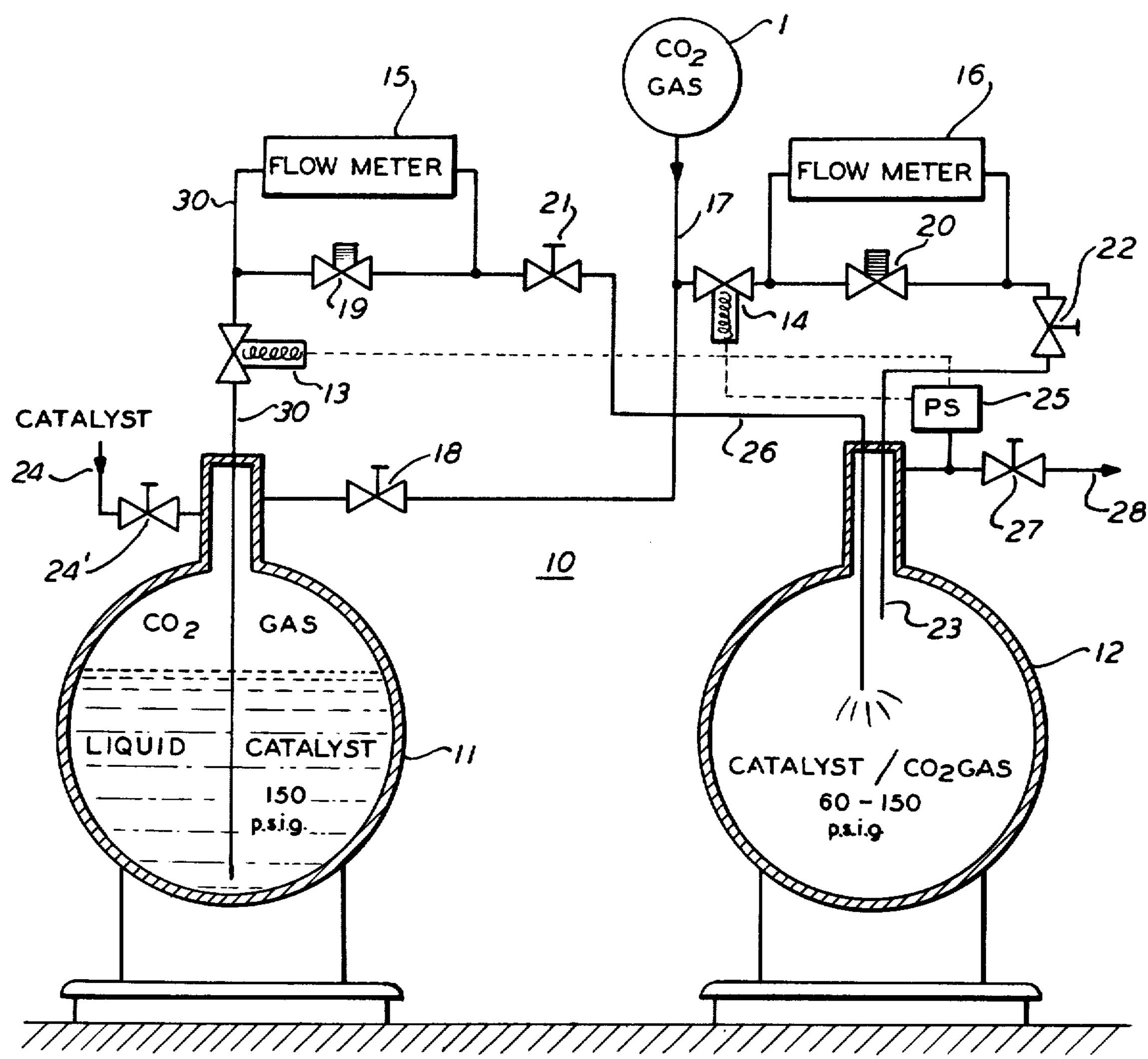
FIG. 1 is a diagrammatic view of apparatus for providing a mixture of a liquid catalyst material in an inert carrier gas in predetermined weight proportions.

Referring now to FIG. 1 of the drawing, illustrated therein is an exemplary embodiment of apparatus for providing a mixture of a liquid catalyst and an inert carrier medium in predetermined proportions. Apparatus 10 generally includes liquid storage vessel 11, mixing vessel 12, pressure switch 28 and suitable valves and conduits. Storage vessel 11 may take the form of a conventional vessel capable of storing a liquid catalyst such as dimethylethylamine (DMEA) under a pressure of approximately 150 p.s.i.g. Vessel 11 is preferably comprised of steel and to provide adequate safety tolerances, is designed to withstand pressures on the order of 375 p.s.i.g. A conduit 17 is connected to a supply 1 of an inert media, which supply may comprise gaseous carbon dioxide under a pressure of approximately 150 p.s.i.g. Although carbon dioxide is preferred as an inert medium, other inert media such as nitrogen, etc. may be utilized. Additionally, conduit 17 is connected through a conventional adjustable valve device 18 to an inlet of storage vessel 11. A conduit 24 is connected to a supply of a liquid catalyst, such as for example, dimethylethylamine (DMEA) and is connected through a conventional adjustable valve device 24' to a further inlet of storage vessel 11.

A conduit 30 is disposed so as to extend through the top or upper wall portion of vessel 11 into the lower reaches thereof. The portion of conduit 30 exterior to vessel 11 is preferably flexible and may be lined with a material such as Teflon while the portion thereof extending into vessel 11 is preferably comprised of a material such as stainless steel. It will be understood that although stainless steel is preferred as a material comprising the latter portion of conduit 30 any other suitable material which does not significantly react with $CO_2$ in the presence of an amine catalyst may be utilized as well. In addition, conduit 30 is sealed by any suitable sealing means to the upper portion of vessel 11, thereby preventing the escape of $CO_2$ gas therefrom. Conduit 30 is connected through a solenoid valve 13, which may take the form of a conventional valve which is operated upon the activation and de-activation of a solenoid coil therein, to the parallel arrangement of flow meter 15 and bypass valve 19. Flow meter 15 may take the form of a commercially available device which provides a visual indication of the flow rate of a material therethrough. Preferably, flow meter 15 is calibrated in terms of the weight of such materials and provides a reading, for example, in terms of pounds/-hour of material flowing therethrough. Bypass valve 19, which may comprise a conventional on-off valve device, is connected between the inlet and outlet of flow meter 15. Downstream from the parallel connection of flow meter 15 and bypass valve 19 is a conventional adjustable valve 21, the outlet of which is connected to conduit 26.

Conduit 17 is additionally connected to the inlet of solenoid valve 14 which may comprise a conventional solenoid valve similar to valve 13. The outlet of solenoid valve 14 is connected to a parallel arrangement of flow meter 16 and bypass valve 20, each of which latter elements is substantially similar to flow meter 15 and bypass valve 19, respectively. However, it should be noted that flow meter 16 is preferably calibrated to provide a visual indication of the flow rate of $CO_2$ gas in terms of lbs. of $CO_2$ per hour, while flow meter 15 is calibrated in terms of the lbs. of liquid catalyst per hour. It will be recognized, however, that other units of weight and time may be utilized. Valve 22 which is connected downstream of the parallel arrangement of flow meter 16 and bypass valve 20 may comprise an adjustable valve device similar to valves 18 and 21. The outlet of valve 22 is connected to conduit 23 which in turn is disposed to extend in a sealed relation through an upper wall of mixing vessel 12. In addition, conduit 26 is likewise sealed to and extends through the upper wall of vessel 12. Preferably, the portions of conduits 23 and 26 exterior to vessel 12 are formed from the same material as conduit 30 and the portion extending into vessel 12 is comprised of stainless steel or other suitable material which is not highly reactive with carbon dioxide in the presence of amine catalysts.

Mixing vessel 12 may comprise any suitable vessel for mixing a liquid and a gas therein. Vessel 12 may, for example, be comprised of a material such as stainless steel and is designed to withstand, with sufficient safety margins, pressures on the order of 55–90 p.s.i.g. therein. A suitable outlet of vessel 12 is connected through a conventional adjustable valve device 27 to a conduit 28 which will be described in greater detail hereafter. In addition, a pressure sensitive switch 28 is likewise connected to the outlet of vessel 12 and is effective in known manner to detect the pressure therein. Switch 28 is electrically coupled to solenoid valves 13 and 14 and, as will be described in greater detail hereafter, is effective to close each solenoid valve in response to the pressure within vessel 12 decreasing below a predetermined level.

Operation of the exemplary proportioning apparatus 10 will now be described. Initially, valve 24' is opened enabling the passage of liquid catalyst through conduit 24 into storage vessel 11. The level of catalyst within vessel 11 may be controlled such that upon reaching a predetermined level, valve 24' is closed. Upon filling vessel 11 to a predetermined level, valve 18 is opened to permit the pressurization of vessel 11 by $CO_2$ gas supplied from source 1. Although it is preferred to pressurize vessel 11 to approximately 150 p.s.i.g., it will be understood that any suitable pressure may be maintained therein. Upon pressurization of vessel 11, solenoid valve 13 which is normally maintained in a closed condition, is opened to permit a flow of liquid catalyst from vessel 11 through conduit 30. By initially closing bypass valve 19, the total flow of liquid is constrained to pass through flow meter 15, through adjustable valve 21 and conduit 26 for the subsequent introduction thereof into mixing vessel 12. Valve 21 is set to any convenient position which permits the passage of liquid therethrough and, as will be described hereafter, valve 21 is adjusted to enable a proportioning of the liquid catalyst with respect to the rate at which $CO_2$ gas is introduced into vessel 12. Solenoid valve 14 which is also normally maintained in a closed condition is opened to permit the passage of $CO_2$ gas therethrough. Bypass valve 20 is initially closed thereby causing $CO_2$ gas to flow through flow meter 16 and adjustable valve 22 to conduit 23 for the subsequent introduction of $CO_2$ gas into mixing vessel 12. As noted previously with respect to valve 21, valve 22 is likewise initially opened to permit the passage of $CO_2$ gas therethrough for the subsequent introduction thereof through conduit 23 into mixing vessel 12.

During this initial stage of the operation of proportioning apparatus 10, valve 27 is closed thereby inhibiting the flow of any catalyst/inert gas mixture through conduit 28.

In order to establish a particular weight ratio between the catalyst and the $CO_2$ carrier gas of the mixture supplied from mixing vessel 12, valves 21 and 22 are adjusted with the particular flow rate of material (e.g. lbs./hr.) through each valve being indicated by flow meters 15 and 16 respectively. Thus, by calibrating flow meters 15 and 16 in terms of pounds per hour of material flowing therethrough, the total flow rate (lbs./hr.) may be readily determined by adding together the flow rates exhibited by flow meters 15 and 16. The subsequent adjustment of each valve 21 and 22 is thereby effective to proportion the total flow between desired amounts of liquid catalyst and the $CO_2$ carrier gas. As previously indicated, the mixture supplied through conduit 28 is comprised of at least 10 percent and preferably 12 percent by weight of liquid catalyst and approximately 88–90 percent by weight of inert carrier gas. To establish this particular proportion of catalyst and inert carrier gas, valves 21 and 22 are appropriately adjusted.

The pressure within mixing vessel 12 is preferably maintained within a range of 60–150 p.s.i.g. although it will be understood that other suitable pressures may be maintained therein. In addition, by introducing the liquid catalyst through conduit 26 into vessel 12 under the aforementioned pressure conditions, the liquid catalyst will be effectively and uniformly dispersed throughout the carrier gas. While the ratio of 12 percent catalyst/88percent carrier gas is preferred, other percentages of liquid catalyst may be utilized. Thus, the phenomenon whereby an inert gas such as $CO_2$ is effective to carry a liquid material such as DMEA is not limited to mixtures comprising 12 percent liquid catalyst and 88 percent carrier gas, although this particular mixture of catalyst and carrier gas is preferred in order to satisfy an objective of the invention, namely providing the highest concentration of catalyst to a core box assembly yet assuring sufficient safety in operation due to the relatively high degree of flammability and toxicity exhibited by such catalysts.

Preferably, conduits 17, 23, 24, 26, etc. connected to vessels 11 and 12 are comprised of flexible, Teflon-lined tubing which readily enables the placement of such vessels at locations remote from working environments. In addition, a scale (not shown) may be placed beneath vessel 11 to indicate the weight thereof and hence when refilling with catalyst is necessary.

Upon the establishment of a predetermined mixture of liquid catalyst and inert carrier gas, and the supply thereof through conduit 28, bypass valves 19 and 20 are opened thereby diverting the flow of liquid catalyst and carrier gas from flow meters 15 and 16, respectively. In the subsequent utilization of the aforementioned catalyst/inert carrier mixture in a cyclical core making process as will be described hereafter, the mixture supplied through conduit 28 is utilized as a "make-up" and is intermittently supplied downstream. Thus, in order to avoid substantial fluctuations in flow through flow meters 15 and 16, it has been found preferable to utilize such flow meters only to the extent of establishing an initially proportioned catalyst/inert carrier mixture and subsequently causing any subsequent intermittent flow of catalyst or carrier gas to bypass respective flow meters. In this manner, flow meters 15 and 16 are not required to withstand large flow fluctuations and hence, the effective life of such meters is significantly prolonged.

Pressure switch 25 is effective to sense the pressure of the mixture supplied from mixing vessel 12 and in the event that such pressure decreases below a predetermined value such as 60 p.s.i.g. indicating a withdrawal of the mixture from vessel 12, appropriate signals are supplied to normally closed solenoid valves 13 and 14 thereby opening the same and permitting the flow of liquid catalyst and $CO_2$ gas therethrough. The catalyst/$CO_2$ mixture is thereby intermittently formed in mixing vessel 12. In addition, suitable pressure sensing means (not shown) may be provided to maintain solenoid valves 13 and 14 closed upon loss of $CO_2$ gas supply 1. In this manner, the entire proportioner apparatus 10 is effectively disabled and thereby prevents the flow of the flammable catalyst to subsequent utilization devices without an adequate inert carrier medium.

Figure 2:
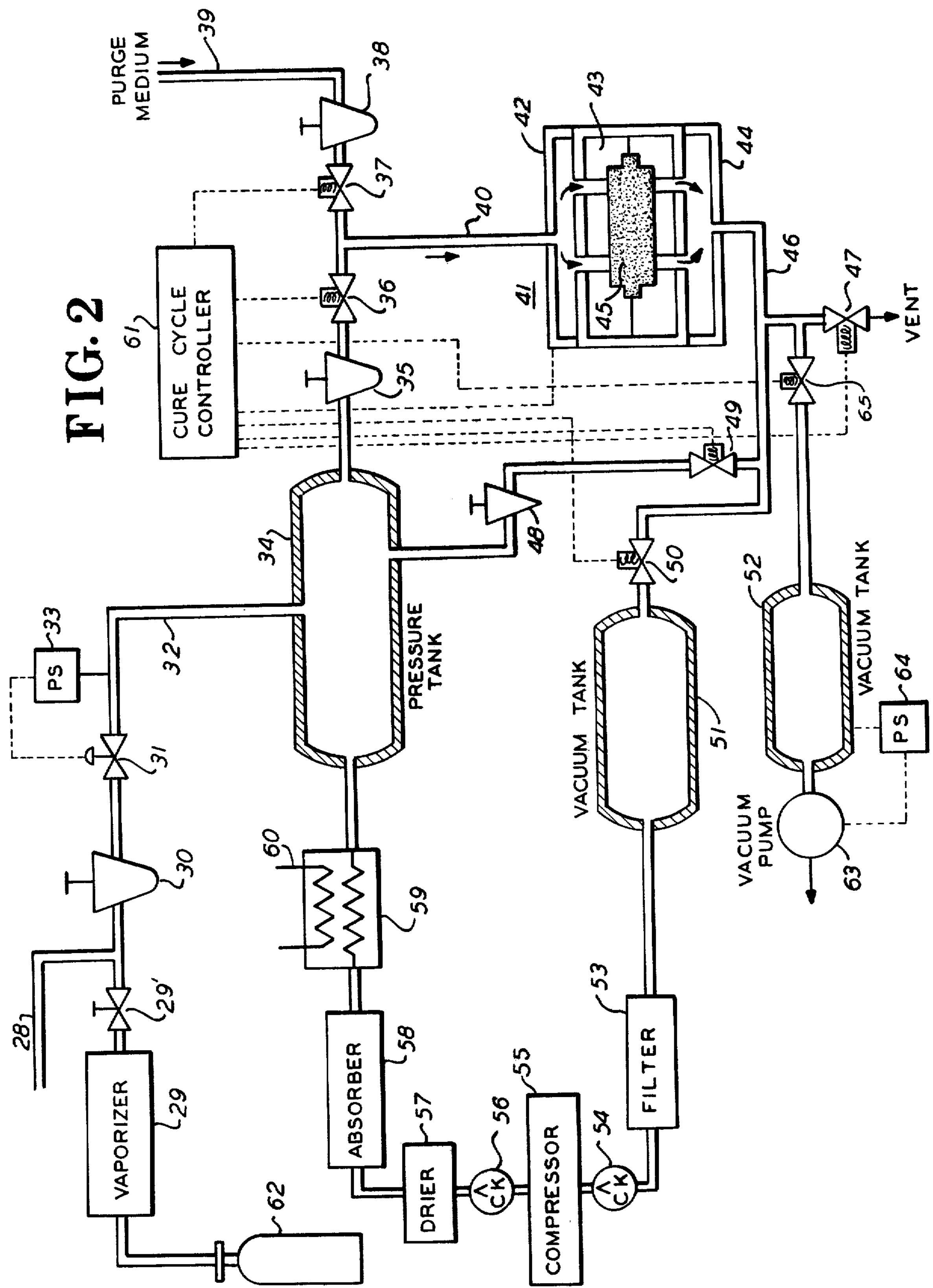
FIG. 2 is a diagrammatic view of apparatus for reclaiming surplus catalyst material from a cold box core making process.

Referring now to FIG. 2, illustrated therein is an exemplary embodiment of apparatus for reclaiming catalyst utilized in a cold box core making process which apparatus generally includes vaporizer 29, pressure tank 34, vacuum tanks 51 and 52, core box assembly 41, compressor 56, cure cycle controller 61 and associated valves, regulators and conduits. A conventional cylinder 62 adapted to retain a mixture of liquid $CO_2$ and a liquid catalyst such as DMEA is connected through suitable valves (not shown) to a vaporizer 29. Vaporizer 29 may comprise a conventional device for vaporizing an inert liquid such as carbon dioxide and, for example, may be a vaporizer commercially available from Airco, Inc. under No. 059-70403. Vaporizer 29 is connected through a conventional on-off valve 29' to communicate with pressure regulator 30 which may take the form of a known device for maintaining the pressure of a gaseous medium at a predetermined value. The outlet of pressure regulator 30 is connected through a conventional solenoid valve 31 through conduit 32 to pressure tank 33. Solenoid valve 31 may take the form of a device for selectively passing or inhibiting the flow of a gaseous medium therethrough in response to a control signal. A pressure switch 33, which may comprise a conventional high-low pressure switch is suitably disposed to detect the pressure of the gaseous medium in conduit 33 and is effective in known manner, to supply a control signal to solenoid valve 31 upon detection of a pressure above or below predetermined high and low values thereby closing or opening valve 31, respectively.

Pressure tank 34 may comprise any vessel suitable for retaining a highly toxic and flammable material, such as DMEA. Although the pressure within tank 34 will generally be maintained at approximately 50–90 p.s.i.g. it is preferable that such a vessel be designed to withstand substantially greater pressures, such as for example, 2,000 p.s.i.g. in order to provide sufficient safety tolerances. Pressure tank 34 is disposed in communication with a pressure regulator 35 which may comprise a regulating device similar to the aforedescribed pressure regulator 30. The outlet of pressure regulator 35 is connected through a solenoid valve device to conduit 40 which in turn is disposed in communication with a core box assembly 41. Solenoid valve 36 may take the form of any conventional valve device which selectively passes or inhibits the flow of a gaseous medium therethrough in response to a particular control signal. A purge medium, which may comprise air, carbon dioxide, nitrogen or other suitable material is supplied through conduit 39, pressure regulator 38, solenoid valve 37 and conduit 40. Solenoid valve 37 and pressure regulator 38 may comprise devices similar to regulator 35 and valve 36, respectively. The particular application of a purge medium to conduit 40 and the effects thereof will be described in greater detail hereafter.

Core box assembly 41 is generally comprised of core box 43 and manifolds 42 and 44. As those familiar with the core making art will appreciate, core box 43 may be comprised of any suitable metallic or plastic material and is, in effect, a mold in which cores are formed from core material 45. In the cold box core making process, core materials 45, such as sand and a suitable known resin binder, such as a phenolic resin, are introduced into the core box 43 which is then translated, preferably automatically, to form a portion of core box assembly 41. Conduit 40 is thereby disposed in communication with core box 43 by way of a conventional manifold device 42 and a vent or exhaust manifold 44 is also provided as an integral portion of core box assembly 41 with vent conduit 46 being connected to manifold 44. It will be understood that upon introduction of a liquid catalyst/inert gas carrier mixture through conduit 40 and the exposure of core material 45 thereto, the core material is cured or hardened. Preferably, control means (not shown) are provided to effect the opening and closing of core box assembly 41. In addition, by providing a catalyst such as liquid DMEA in a concentration of, for example, 12 percent by weight in an inert carrier medium, such as $CO_2$, the time necessary to effect a curing of core material 45 is substantially reduced with respect to core curing times obtained in previous cold box core making processes. For example, it has been found that utilization of a DMEA catalyst at the aforementioned concentration in an inert carrier media effects a reduction of core curing times of approximately 80 percent with respect to curing times obtainable from use of 2 percent DMEA catalyst in air.

In the course of curing core material in the aforementioned cold box process, it has been found that approximately 50 percent of the catalyst material supplied in contact with core material 45 is entrapped therein. Thus, approximately 50 percent of the supplied catalyst, which in prior art techniques has been disposed of by acid scrubbing or incineration as described hereinbefore, is reclaimed for further use by means of manifold 44 and conduit 46 and the application thereto of suitable suction forces, as will be described in greater detail hereafter. A suitable vent to atmosphere is connected through a conventional solenoid valve 47 to conduit 46. Furthermore, pressure tank 34 is disposed in communication with a known pressure regulating device 48, the outlet of which is selectively connected through solenoid valve 49 to conduit 46 for the purpose of supplying at appropriate moments a slight "reverse" pressure to manifold 44. Pressure regulating device 48 which may take the form of a conventional device capable of reducing an inlet pressure to a predetermined outlet pressure is provided. For example, the exemplary pressure of 50–90 p.s.i.g. within tank 34 is conveniently reduced to a slight positive pressure, e.g. 5 p.s.i.g. by means of pressure regulating device 48. A further conventional solenoid valve device 50 is disposed in communication with conduit 46 and a suitable vacuum tank 51.

A conventional vacuum pump 63 is connected to a vacuum tank 52 and is effective to establish a vacuum pressure of approximately 5–6 p.s.i.a. therein. A pressure switch 64 which is coupled to tank 52 and vacuum pump 63 in known manner is effective to activate pump 63 whenever the pressure within tank 52 exceeds a predetermined level and thereby maintain approximately the foregoing vacuum pressure therein. A conventional solenoid valve 65 which is connected between vacuum tank 52 and conduit 46 is operated in response to control signals supplied from controller 61. Thus, upon opening valve 65, a vacuum force is applied to the exhaust manifold 44 of core box assembly 41.

Filter 53 which may comprise a known device for removing solid particulate matter from a gaseous medium is connected to vacuum tank 51 and is effective to remove any solid impurities from the catalyst/inert carrier mixture supplied from tank 51. A check valve 54 is connected between filter 53 and the suction side of a compressor 55 which may comprise a conventional vapor compressing device effective to increase the pressure of a gaseous medium from a slight vacuum pressure to a level of approximately 50–90 p.s.i.g. Compressor 51 may, for example, be comprised of a compressor commercially available from Corken Pump Company, Oklahoma City, Okla. under Model No. D-390. It will be understood that compressor 55 is effective to maintain a vacuum pressure of, for example, 5–7 p.s.i.a. in vacuum tank 51. The pressure side of compressor 55 is connected through a conventional check valve 56 to a drier 57 which in turn is effective to remove any moisture which may be present in the catalyst/inert carrier mixture. An absorber 58, which may comprise a conventional device for removing gaseous impurities from a gaseous medium is connected in communication with the outlet of drier 57. It has been found that upon curing of resin binders, such as isocyanates, in a cold box core making process, certain impurities are retained in the catalyst extracted from core box 43 and it is such impurities that are removed from the dried catalyst/inert carrier mixture supplied to absorber 58.

A heat exchange means 59, which may comprise a conventional water cooled device for removing heat from a gaseous flow is disposed in communication with the outlet of absorber 58 and an inlet of pressure tank 34. As a consequence of compressing the catalyst/inert carrier mixture, the temperature thereof is increased to approximately 300°–350°F and in order to deliver the reclaimed catalyst/inert carrier mixture to pressure tank 34 at an optimum temperature of approximately 140°–190°F, the mixture is cooled by means of heat exchange means 59. A suitable coolant such as water is passed through a cooling coil 60 of heat exchange means 59 and it will be understood that the heat exchange means is configured so as to provide the requisite cooling effect necessary to provide the aforementioned reduction in temperature of the catalyst/inert carrier mixture. Additionally, compressor 55 may comprise a two-stage compressing device with an intercooler provided therewith, in order to limit to the extent practicable the temperature of the catalyst/inert carrier mixture compressed therein. In the foregoing manner, the cooling effect generated by heat exchange means 59 is effective to maintain optimum temperature and density of catalyst mixtures such as DMEA/$CO_2$ when compressed to pressures of up to about 90 p.s.i.g.

Cure cycle controller 61, which may take the form of a conventional timing and programming apparatus effective to control an automated core box assembly and associated solenoid valves, and which is commercially available from Airco, Inc. under No. 059-70425, is provided with a plurality of electrical outputs which are depicted in FIG. 2 as dashed lines. Controller 61 is connected to solenoid valves 36, 37, 47, 49 and 50, and is effective in known manner to provide appropriately timed control signals to selectively control the operation of such valves and the opening and closing of core box assembly 41 as will be described in greater detail hereafter.

The operation of the exemplary catalyst reclamation apparatus illustrated in FIG. 2 in accordance with the invention will now be described. A catalyst/inert carrier mixture, e.g. 12 percent DMEA/88 percent $CO_2$ gas is supplied through conduit 28 to pressure regulator 30. The foregoing mixture may be intermittently formed in the proportioner assembly illustrated in FIG. 1 or the mixture may be supplied by premixed bulk containers or bulk trailers via suitable piping from an exterior location. Alternatively, one or a plurality of conventional cylinders 62 may be connected, through a manifold where appropriate, to the inlet of vaporizer 29 wherein a liquid carrier such as $CO_2$ is vaporized. In this instance, valve 27 (FIG. 1) will be closed and valve 29' will be opened. It will be appreciated that the particular form of the means for supplying the catalyst/inert carrier mixture will be dictated by practical considerations, such as the number of core box assemblies 41, the catalyst flow required for each such assembly and operating schedules. The catalyst/inert carrier mixture is introduced into pressure tank 34 through regulator 30 and valve 31 until high-low pressure switch 33 detects the attainment of a predetermined pressure within tank 34 and in response thereto provides a control signal which in turn closes valve 31 to inhibit any further supply of the mixture to tank 34. However, as the catalyst/inert carrier mixture is withdrawn from tank 34 to cure core material 45, the pressure within tank 34 decreases accordingly. This condition is monitored by pressure switch 33 and upon detection of a predetermined low pressure value, switch 33 applies a control signal to valve 31 opening the same and causing the introduction of additional "make-up" amounts of the catalyst/inert carrier mixture into pressure tank 34.

Concurrent with the foregoing, cure cycle controller 61, vacuum pump 63 and compressor 55 are suitably energized and a core box 43 filled with an appropriate core material and resin binder mixture 45. Core box 43 is then inserted within core box assembly 41, which is closed to the atmosphere, preferably in an automatic manner well known to those skilled in the art. The programming and timing mechanisms (not shown) of controller 61 are adjusted such that initially all solenoid valves are maintained in a closed condition. Initially, controller 61 is effective to supply a control signal to solenoid valves 65 to open this valve for a period of approximately 1–3 seconds to subject exhaust manifold 44 and core box 43 to a vacuum pressure. In this manner the major portion of air contained in the core material, approximately 40 percent by volume, is evacuated from core box 43 prior to the curing of core material 45. Vacuum pump 63 is effective to restore a pressure of approximately 5–6 p.s.i.a. in tank 52 in response to a signal generated by pressure switch 64. This signal is produced upon detection by switch 64 of increased tank pressure resulting from the admittance of core air into vacuum tank 52. Controller 61 is then effective to remove the control signal from valve 65 closing the same and to preferably supply a control signal to solenoid valve 49 to open this valve for a brief period, e.g. 1–1½ seconds. During this period, the catalyst/inert carrier mixture is passed from tank 34 through regulator 48 and valve 49 into the exhaust manifold 44 of core box assembly 41 at a pressure of approximately 5 p.s.i.g. The purpose of providing such a "reverse" cure of core material 45 is to initially effect a curing of the portion of core material remote from the material which is exposed to the higher pressure main catalyst/inert carrier mixture introduced into core box assembly 41 through conduit 40. It has been found that as this latter stream is (supplied through pressure regulator 35) of an elevated pressure, e.g. 30–50 p.s.i.g., a slight amount of the core material remote from the initial contact between the catalyst supplied through manifold 41 is caused to enter the exhaust manifold 44 and eventually be withdrawn therefrom into the catalyst reclamation system. However, by providing the aforementioned reverse cure for a relatively short time period, such remote portions of core material 45 are cured and upon introduction of the main "gassing" stream of catalyst/inert carrier mixture into core box 43, the likelihood of any core material being withdrawn into exhaust manifold 44 is substantially eliminated.

Upon completion of the foregoing reverse cure, controller 61 supplies an appropriate signal for closing solenoid valve 49 and opening solenoid valve 36 which in turn permits the introduction of the catalyst/inert carrier mixture into core box assembly 41 to effect the gassing of cores, preferably at an inlet pressure of 30–50 p.s.i.g. Concurrently, controller 61 produces an appropriate signal to open valve 50 and thereby supplying a vaccum pressure, e.g. approximately 12 p.s.i.a., through conduit 46 to exhaust manifold 44. During this period, which may last for approximately 2–10 seconds, the relatively highly concentrated catalyst mixture (e.g. 12 percent DMEA) is effective to harden or cure core material 45 and the catalyst/inert carrier mixture which is not entrapped within core material 45 during the curing thereof is extracted by suction from core box 43 through manifold 44, conduit 46 and solenoid valve 50 into vacuum tank 51. Upon completion of the cure period, the control signal supplied to valve 36 by controller 61 is removed thus closing this valve although exposure of core box 43 to the aforementioned vacuum pressure is permitted to continue for approximately 2–4 seconds thereby facilitating the reclamation of surplus catalyst. Upon termination of this latter period, controller 61 is effective to close valve 50 by terminating the control signal supplied thereto. The extracted catalyst/inert carrier mixture is then passed through filter 53 and check valve 54 as a result of the suction pressure (e.g. approximately 7 p.s.i.a.) at the inlet of compressor 55. The withdrawn mixture is then compressed, dried and purified before being cooled in heat exchange means 59 and returned to pressure tank 34 for further use in cold box core making processes. A purge period may then be activated, if necessary, as a result of controller 61 supplying control signals to solenoid valves 37 and 47. The latter valves are thereby opened to enable the passage of a purge medium such as, for example, air, carbon dioxide, or nitrogen through conduit 39, regulator 38, valve 37 and conduit 40 to core box assembly 41. Application of the purge medium in the foregoing manner is effective to remove any residual traces of the catalyst/inert carrier mixture in core box 43 and effects the venting of such residual material to atmosphere through solenoid valve 47. The purge period is terminated after approximately 2–3 seconds upon the production of appropriate control signals and the application thereof to solenoid valves 37 and 47, thereby closing such valves. Additionally, core box assembly 41 is now opened in response to a further signal supplied by core-blowing equipment control devices (not shown) to enable the removal of a cured or hardened core and the subsequent re-introduction into assembly 41 of uncured core material 45. The cycle is completed by the closure of core box assembly 41 and a new cycle is initiated by controller 61 by the opening of solenoid valve 49 and the commencement of the "reverse" cure as described hereinbefore may be effected.

From the foregoing description, it will be apparent that substantially all of the catalyst/inert carrier mixture supplied to core box assembly 41 and remaining therein upon completion of the curing of core material 45 is reclaimed for subsequent curing steps. In addition, it will be appreciated that vacuum tanks 51 and 52, vacuum pump 63, compressor 55 and pressure tank 34 may be provided with sufficient capacity to enable, through suitable manifold devices (not shown), the simultaneous curing of a plurality of core materials. In this event, a plurality of core box assemblies 41 and suitable valves and conduits are provided and while a single cure cycle controller 61 may be utilized, the programming and timing mechanisms thereof will be of a design adequate to assure control over a plurality of such core box assemblies.

While the present invention has been particularly described in terms of specific embodiments thereof it will be understood that numerous variations upon the invention are now enabled to those skilled in the art, which variations are yet within the scope of the instant teaching. Accordingly, the present invention is to be broadly construed and limited only by the scope and spirit of the claims now appended hereto.

What is claimed is:

1. A cold box coremaking process wherein a core material-resin binder mixture is cured in a core box assembly having separate inlet and exhaust manifolds comprising the steps of: supplying a liquid catalyst/gas carrier mixture, with said liquid catalyst comprising at least 10 percent by weight of said mixture, to said inlet manifold at a predetermined positive pressure thereby curing said core material-resin binder mixture in a single gassing period, applying a vacuum pressure to said exhaust manifold to extract surplus liquid catalyst/gas carrier mixture from said assembly while supplying said liquid catalyst/gas carrier mixture to said inlet manifold; compressing said extracted mixture to substantially said predetermined positive pressure; and subsequently returning said compressed liquid catalyst/gas carrier mixture to said inlet manifold at said predetermined pressure to enable curing of further core material-resin binder mixtures.

2. A process as defined in claim 1 additionally comprising the step of removing solid impurities from said extracted mixture prior to compression thereof.

3. A process as defined in claim 1 additionally comprising the steps of drying said compressed liquid catalyst/gas carrier mixture and subsequently removing gaseous impurities from said dried mixture.

4. A process as defined in claim 3 additionally comprising the step of cooling said liquid catalyst/gas carrier mixture to a temperature in the range of approximately 140°–190°F subsequent to the removal of said gaseous impurities.

5. A process as defined in claim 1 wherein said gas carrier is an inert gas and additionally comprising the step of initially supplying said liquid catalyst/gas carrier mixture to said exhaust manifold under a positive pressure to initially cure a portion of said core material-resin binder mixture prior to supplying said liquid catalyst/gas carrier mixture to said inlet manifold.

6. A process as defined in claim 5 wherein said step of returning said compressed catalyst comprises supplying said compressed catalyst to a pressure vessel at substantially said predetermined positive pressure.

7. A process as defined in claim 6 additionally comprising the step of introducing further amounts of said liquid catalyst/gas carrier mixture into said pressure vessel at substantially said predetermined positive pressure thereby compensating for the reduction of catalyst caused by the entrapment of said catalyst in said core material-resin binder mixture upon curing thereof.

8. A process as defined in claim 7 additionally comprising the steps of supplying said liquid catalyst in an inert liquid carrier, vaporizing said liquid carrier to form an inert gas carrier medium and supplying said liquid catalyst/inert gas carrier mixture to said pressure vessel at substantially said predetermined positive pressure.

9. A process as defined in claim 7 additionally comprising the steps of mixing said liquid catalyst and said inert gas carrier medium by injecting liquid dimethyethylamine into carbon dioxide gas such that said dimethylethylamine comprises at least 10 percent by weight of said mixture of liquid dimethylethylamine and carbon dioxide gas; and passing said liquid catalyst/inert carrier mixture to said prsssure vessel.

10. A process as defined in claim 1 additionally comprising the steps of supplying a purge gas to said core box assembly subsequent to the extraction of surplus liquid catalyst/gas carrier mixture therefrom and terminating the supply of said purge gas prior to the introduction of said liquid catalyst/gas carrier mixture therein.

11. A method for curing a core material-resin binder mixture comprising the steps of supplying a catalyst in the form of a mixture essentially consisting of at least 10 percent DMEA liquid by weight in an inert carrier gas to a core box assembly by injecting liquid DMEA at a first predetermined flow rate into a mixing vessel; introducing said inert gas carrier into said mixing vessel at a second predetermined flow rate thereby forming said liquid DMEA/inert gas carrier mixture; and passing said liquid DMEA/inert gas carrier mixture to the inlet manifold of said core box assembly at a positive pressure thereby curing said core material-resin binder mixture substantially completely in a single period of exposure of said liquid DMEA/inert gas carrier mixture to said core material-resin binder mixture.

12. A method for curing a core material-resin binder mixture comprising the steps of supplying a liquid catalyst/gas carrier mixture with said liquid catalyst comprising at least 10 percent by weight of said liquid catalyst/gas carrier mixture to a core box assembly at a positive pressure thereby curing substantially all of said core material-resin binder mixture in a single gassing period; applying a vacuum pressure to an exhaust manifold of said core box assembly to extract surplus liquid catalyst/gas carrier mixture from said core box assembly during said gassing period; and removing said cured core material-resin binder mixture from said core box assembly after termination of said gassing period.

13. A method as defined in claim 12 wherein said liquid catalyst is dimethylethylamine and said gas carrier is carbon dioxide.

14. Apparatus for curing a core material-resin binder mixture in a core box assembly having inlet and outlet manifolds comprising means for supplying to said inlet manifold a liquid catalyst/gas carrier mixture with said liquid catalyst comprising at least 10% by weight of said liquid catalyst/gas carrier mixture at a positive pressure such that substantially all of said core material-resin binder mixture is cured in a single period of exposure of said liquid catalyst/gas carrier mixture to said core material-resin binder mixture; and means for applying a vacuum pressure to said exhaust manifold to withdraw surplus liquid catalyst/gas carrier mixture from said core box assembly during said periiod of exposure.

15. Apparatus for curing a mixture of core material and a resin binder in a core box assembly having separate inlet and exhaust manifolds comprising means for supplying a liquid catalyst/gas carrier mixture, with said liquid catalyst comprising at least 10 percent by weight of said catalyst/carrier mixture, to said inlet manifold at a predetermined positive pressure whereby said core material-resin binder mixture is cured in a single gassing period; means for applying a vacuum to said exhaust manifold to extract surplus liquid catalyst/gas carrier mixture from said core box assembly; means for compressing said extracted surplus liquid catalyst/gas carrier mixture to substantially said predetermined positive pressure; and means for returning said compressed liquid catalyst/gas carrier mixture to said inlet manifold at said predetermined pressure to enable curing of further mixtures of said core material and resin binder.

16. Apparatus as defined in claim 15 wherein said means for supplying said liquid catalyst/gas carrier mixture comprise pressure vessel means for maintaining a supply of liquid catalyst; mixing vessel means; first flow control means communicating with said pressure vessel means for injecting said liquid catalyst into said mixing vessel at a first adjustable, predetermined flow rate; second flow control means communicating with a supply of said gas carrier for introducing said gas carrier into said mixing vessel at a second adjustable predetermined flow rate such that a liquid catalyst/gas carrier mixture of at least 10 percent liquid catalyst by weight is formed therein; and means for passing said liquid catalyst/gas carrier mixture from said mixing vessel to said means for supplying said liquid catalyst/gas carrier mixture to said inlet manifold of said core box assembly.

17. Apparatus as defined in claim 15 further comprising filter means, connected to said means for applying said vacuum force, for removing solid impurities from said extracted catalyst.

18. Apparatus as defined in claim 15 further comprising means connected to said compression means for drying said compressed catalyst and means connected to said drying means for removing gaseous impurities from said catalyst.

19. Apparatus as defined in claim 15 further comprising means for selectively supplying said liquid catalyst/gas carrier mixture to said exhaust manifold at a positive pressure to cure a portion of said core material-resin binder mixture remote from said inlet manifold.

20. Apparatus for curing a core material-resin binder mixture comprising means for supplying a catalyst in the form of a mixture essentially consisting of at least 10 percent DMEA liquid by weight in an inert carrier gas to a core box assembly having an inlet manifold for curing a core material-resin binder mixture therein comprising pressure vessel means for maintaining a supply of said liquid DMEA, mixing vessel means, first flow control means communicating with said pressure vessel means for injecting said liquid DMEA into said mixing vessel at a first predetermined flow rate, second flow control means communicating with a supply of said inert gas carrier for introducing said inert gas carrier into said mixing vessel at a second predetermined flow rate such that a liquid DMEA/inert gas carrier mixture of at least 10 percent DMEA liquid by weight is formed therein; and means for passing said liquid DMEA/inert gas carrier mixture to said inlet manifold of said core box assembly at a positive pressure such that said core material-resin binder mixture is substantially completely cured in a single period of exposure of said liquid DMEA/inert gas carrier mixture to said core material-resin binder mixture.

* * * * *